United States Patent
Ieki et al.

(10) Patent No.: US 7,133,641 B2
(45) Date of Patent: Nov. 7, 2006

(54) WIRELESS COMMUNICATION RF CIRCUIT AND COMMUNICATION APPARATUS INCLUDING THE SAME

(75) Inventors: Tsutomi Ieki, Yokohama (JP); Yoshihiro Yamaguchi, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/497,513

(22) PCT Filed: Apr. 23, 2003

(86) PCT No.: PCT/IB03/01651

§ 371 (c)(1),
(2), (4) Date: May 3, 2005

(87) PCT Pub. No.: WO03/092182

PCT Pub. Date: Nov. 6, 2003

(65) Prior Publication Data

US 2005/0176381 A1     Aug. 11, 2005

(30) Foreign Application Priority Data

Apr. 23, 2002     (JP) ............................. 2002-121038

(51) Int. Cl.
*H04B 7/00* (2006.01)
*H04B 1/40* (2006.01)
*H04Q 5/22* (2006.01)

(52) U.S. Cl. .................. 455/41.1; 455/42; 455/84; 455/78; 340/10.1

(58) Field of Classification Search ............... 455/41.1, 455/41.2, 42; 340/10.1, 10.3, 10.4, 825.58, 340/825.7, 825.77
See application file for complete search history.

(56) References Cited

U.S. PATENT DOCUMENTS

| | | | | |
|---|---|---|---|---|
| 4,956,645 A | * | 9/1990 | Guena et al. | 342/361 |
| 5,164,719 A | * | 11/1992 | Guena et al. | 340/10.34 |
| 5,305,469 A | * | 4/1994 | Camiade et al. | 455/78 |
| 5,402,104 A | * | 3/1995 | LaRosa | 340/539.23 |
| 5,661,757 A | * | 8/1997 | Takahashi et al. | 375/281 |
| 5,774,792 A | * | 6/1998 | Tanaka et al. | 455/78 |
| 5,825,302 A | * | 10/1998 | Stafford | 340/870.01 |
| 6,176,432 B1 | * | 1/2001 | Miyaura | 235/487 |
| 6,427,065 B1 | * | 7/2002 | Suga et al. | 455/41.1 |
| 6,636,146 B1 | * | 10/2003 | Wehoski | 340/10.4 |
| 2001/0049265 A1 | * | 12/2001 | Nakao et al. | 455/73 |
| 2003/0119455 A1 | * | 6/2003 | Nakamura et al. | 455/78 |

FOREIGN PATENT DOCUMENTS

| | | |
|---|---|---|
| EP | 0 878 918 A | 11/1998 |
| FR | 2 653 955 A | 5/1991 |
| JP | 8-116289 | 5/1996 |
| JP | 9-298484 | 11/1997 |

* cited by examiner

*Primary Examiner*—Duc M. Nguyen
(74) *Attorney, Agent, or Firm*—Keating & Bennett, LLP

(57) ABSTRACT

A wireless communication RF circuit includes a transmitting-and-receiving antenna, a modulator circuit, an SPST switching circuit, and a demodulator circuit, which are arranged in a sequence. Upon signal reception, the SPST switching circuit is switched ON, and the demodulator circuit extracts a signal wave from a signal received by the antenna and outputs the signal wave to a control circuit. Upon signal transmission, the SPST switching circuit is switched OFF, and the modulator circuit mixes transmission data supplied from the control circuit with a carrier and outputs the carrier to the antenna. Only a single antenna is required. Upon signal reception, the influence of the modulator circuit is negligible. Upon signal transmission, the SPST switching circuit is switched OFF, thus the effect of the demodulator circuit is negligible, which greatly reduces loss.

24 Claims, 10 Drawing Sheets

FIG. 10
PRIOR ART

WIRELESS COMMUNICATION RF CIRCUIT AND COMMUNICATION APPARATUS INCLUDING THE SAME

BACKGROUND OF THE INVENTION

1. Field of the Invention

The present invention relates to wireless communication radio frequency (RF) circuits for transmitting and receiving radio waves and communication apparatuses including the same.

2. Description of the Related Art

Figure 7:
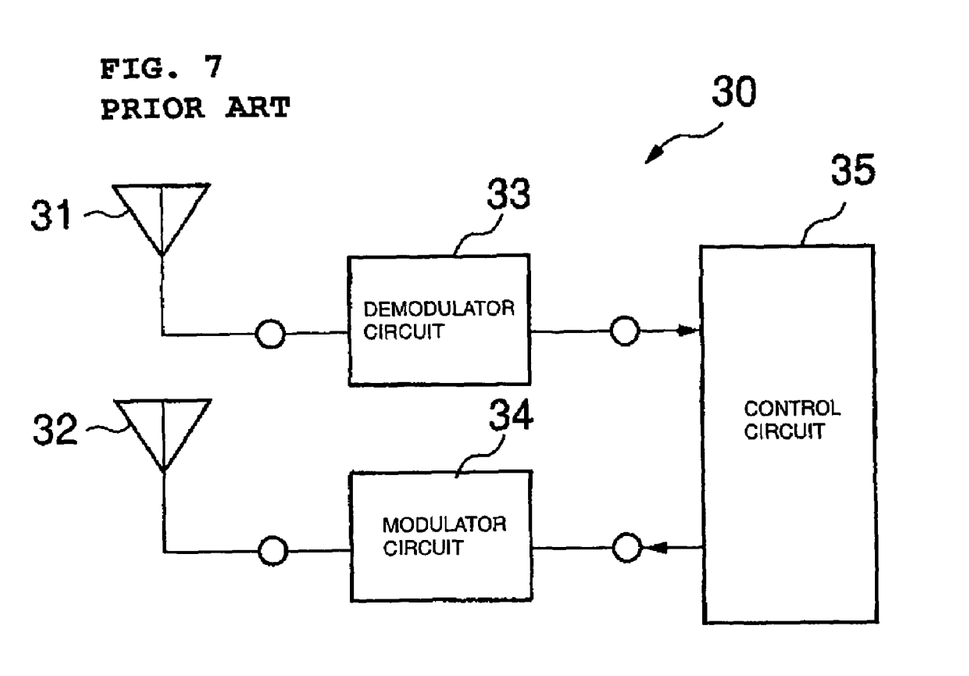
FIG. 7 is a block diagram for describing a known example of a wireless communication RF circuit.

FIG. 7 is a block diagram showing an example of the configuration of a wireless communication RF circuit included in a communication apparatus, along with a control circuit (baseband circuit). A wireless communication RF circuit 30 includes a receiving antenna 31, a transmitting antenna 32, a demodulator circuit 33, and a modulator circuit 34. The wireless communication RF circuit 30 is connected to a control circuit 35.

The demodulator circuit 33 detects a radio wave received by the receiving antenna 31, extracts a signal wave, and outputs the extracted signal wave to the control circuit 35. The modulator circuit 34 mixes a transmission signal (signal wave) supplied from the control circuit 35 with a carrier and outputs the resulting carrier to the transmitting antenna 32. The transmitting antenna 32 wirelessly transmits the modulated wave.

Figure 8:
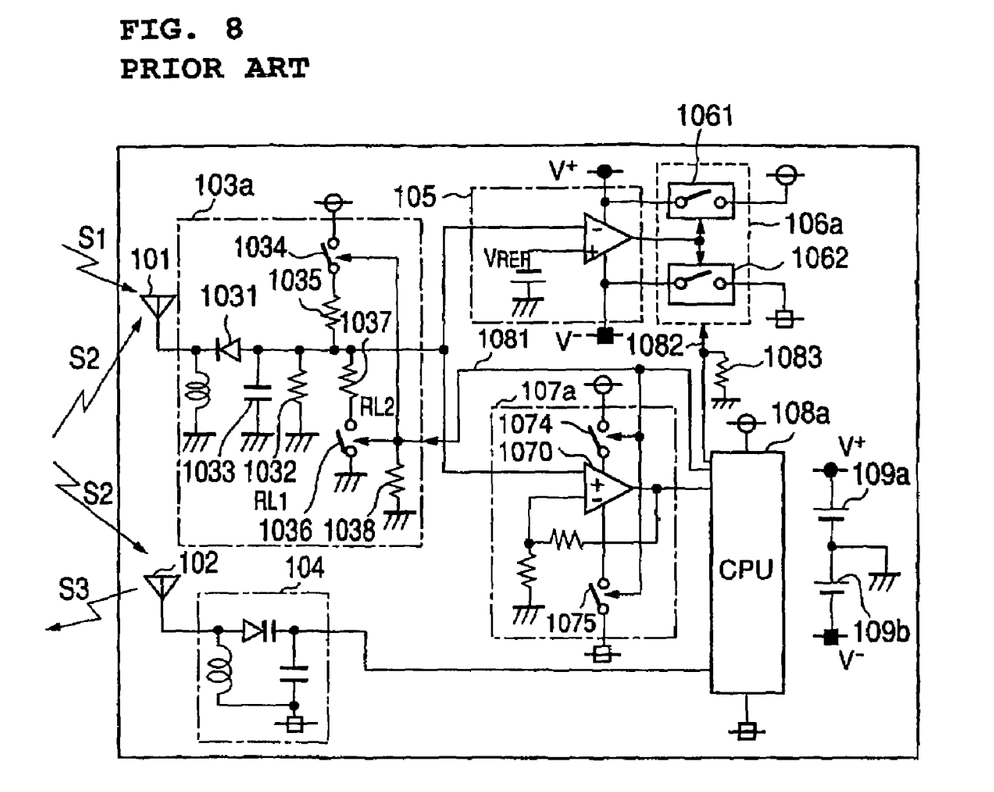
FIG. 8 is a circuit diagram showing a wireless communication RF circuit described in Japanese Unexamined Patent Application Publication No. 8-116289.

FIG. 8 shows a specific example of the configuration of a wireless communication RF circuit having the above-described circuit configuration. The RF circuit is described in Japanese Unexamined Patent Application Publication No. 8-116289. Referring to FIG. 8, numeral 101 denotes a receiving antenna, numeral 102 denotes a transmitting antenna, numeral 103a denotes a detector, numeral 104 denotes a modulator, and numeral 108a denotes a control circuit (CPU).

In the configuration shown in FIG. 7, the receiving antenna 31 and the transmitting antenna 32 are separately provided. The receiving and transmitting antennas 31 and 32 are larger in size than the demodulator circuit 33 and the modulator circuit 34. In addition, the antennas 31 and 32 must be arranged at a distance of approximately λ/2 (λ represents the wavelength of the transmitted/received radio wave) from each other in order to prevent interference therebetween. Specifically, for example, when the frequency of the transmitted/received radio wave is in the 2.4 GHz band, the antennas 31 and 32 must be separated by approximately 6 cm from each other. When the frequency of the transmitted/received radio wave is in the 5 GHz band, the antennas 31 and 32 must be separated by approximately 3 cm from each other. Since the antennas 31 and 32 must be separated from each other, the wireless communication RF circuit 30 is difficult to miniaturize.

Figure 9:
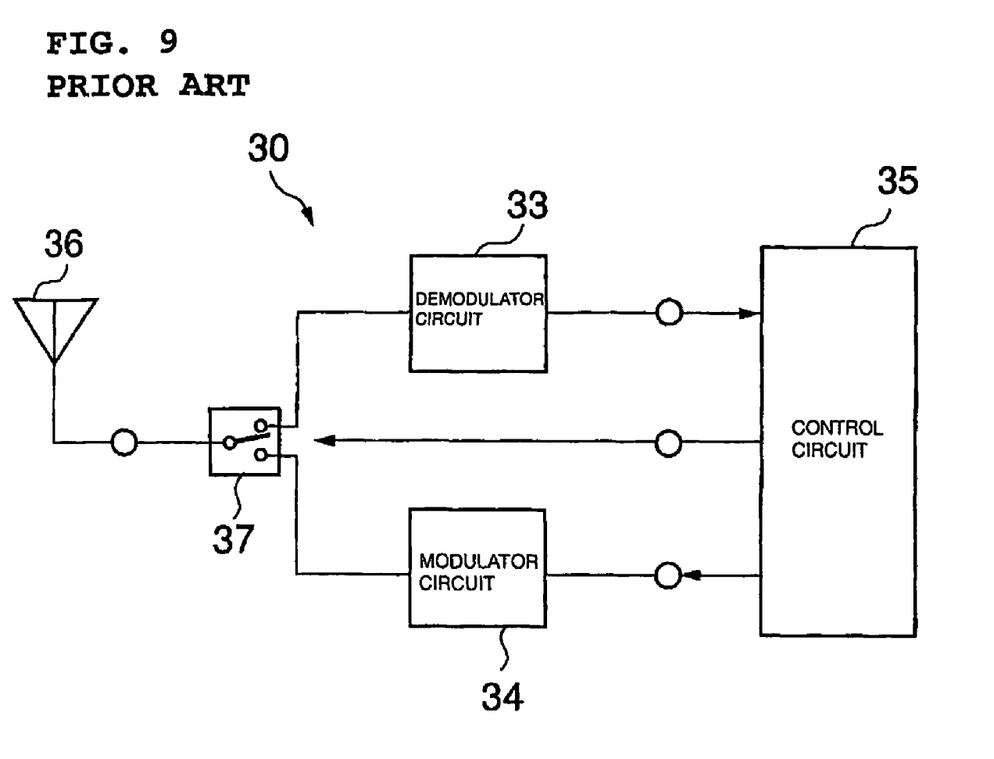
FIG. 9 is a block diagram for describing another known example of a wireless communication RF circuit.

As shown in FIG. 9, a transmitting-and-receiving antenna 36 is provided, and the demodulator circuit 33 and the modulator circuit 34 are connected to the antenna 36 via a transmission/reception selector switch 37. In this case, the number of antennas is reduced, which enables miniaturization of the wireless communication RF circuit 30. On the other hand, an SPDT (Single Pole Double (Dual) Throw) switching circuit serving as the switch 37 is provided. Upon signal reception, the SPDT switching circuit switches to the demodulator circuit, and upon signal transmission, the SPDT switching circuit switches to the modulator circuit. Since the configuration of the SPDT switching circuit is complex, the circuit configuration is complicated. Insertion loss in the switch 37, which produces an increase in loss, is substantial. Specifically, if the modulator circuit 34 is a reflective modulator circuit, upon signal transmission, a signal passes through the SPDT switching circuit a total of two times, that is, when the signal is supplied from the antenna 36 to the modulator circuit 34 and when the signal is reflected by the modulator circuit 34 towards the antenna 36. In this case, since the signal passes through the SPDT switching circuit twice, loss is generated, and loss caused by the SPDT switching circuit is greatly increased.

Figure 10:
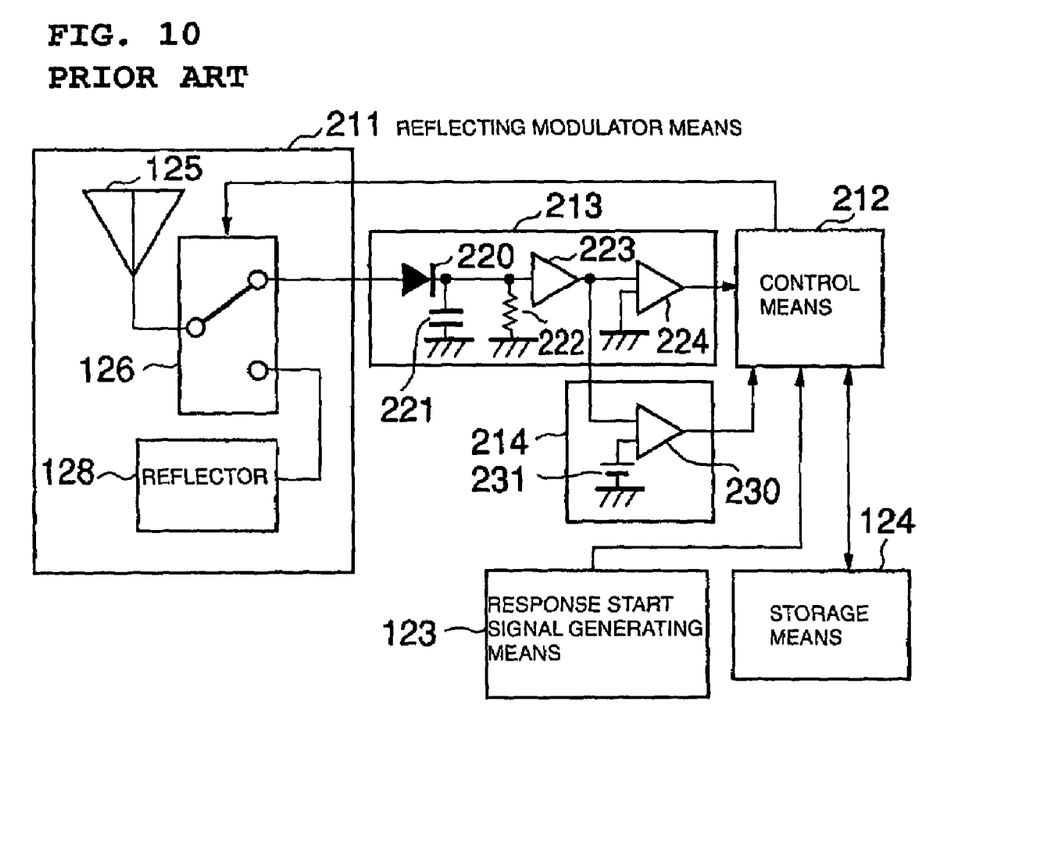
FIG. 10 is a circuit diagram showing a wireless communication RF circuit described in Japanese Unexamined Patent Application Publication No. 9-298484.

FIG. 10 shows a specific example of an RF circuit with the configuration of the RF circuit shown in FIG. 9. The RF circuit is described in Japanese Unexamined Patent Application Publication No. 9-298484.

SUMMARY OF THE INVENTION

In order to overcome the problems described above, preferred embodiments of the present invention provide a low-loss wireless communication RF circuit having a circuit configuration that is easily simplified and miniaturized and a communication apparatus including such a novel RF circuit.

According to a preferred embodiment of the present invention, a wireless communication RF circuit includes an antenna that transmits and receives radio waves, a demodulator circuit that detects a received radio wave received by the antenna and extracts a signal wave, and a modulator circuit that mixes a signal wave supplied from a signal feeder with a carrier. The antenna, the modulator circuit, and the demodulator circuit are serially connected to one another in a sequence. An SPST (Single Pole Single Throw) switching circuit is serially provided between the modulator circuit and the demodulator circuit. The SPST switching circuit is switched ON upon reception to electrically connect a signal received by the antenna to the demodulator circuit and is switched OFF upon transmission to separate the demodulator circuit from the modulator circuit. The SPST switching circuit includes an FET. Accordingly, since the transmitting-and-receiving antenna is provided, the wireless communication RF circuit and the communication apparatus including the same are greatly miniaturized. Since the modulator circuit is not associated with the signal continuity upon signal reception, the SPST switching circuit is required only to be switched ON/OFF for connecting, upon signal reception, the demodulator circuit via the modulator circuit to the antenna and, upon signal transmission, separating the demodulator circuit from the modulator circuit. Since the SPST switching circuit has a simple configuration and reduced size, the circuit configuration of the wireless communication RF circuit and the communication apparatus including the same is simplified, and the wireless communication RF circuit and the communication apparatus are thus miniaturized. Since the SPST switching circuit is provided at a stage that is subsequent to the modulator circuit, upon signal transmission, a signal does not pass through the switching circuit when the signal is supplied from the antenna to the modulator circuit and when the signal is reflected by the modulator circuit towards the antenna. Loss of the transmission signal is greatly reduced, and high gain is thus achieved.

The demodulator circuit may be an AM detector circuit that demodulates a received radio wave whose amplitude has been modulated or an ASK (Amplitude Shift Keying) detector circuit that demodulates a received radio wave that has been ASK-modulated.

The demodulator circuit preferably includes a Schottky barrier diode for a zero-bias detector.

The modulator circuit preferably includes an FET.

Accordingly, the circuit consumes no direct current during the signal standby mode, signal reception mode, and signal transmission mode. Thus, the power consumption is greatly reduced. When the communication apparatus is a battery-driven type, the battery life is greatly extended.

The modulator circuit is preferably a reflective modulator circuit that modulates the phase of the signal received by the antenna in accordance with the signal wave and reflectively transmits the modulated signal. Accordingly, the modulator circuit uses an RF signal received by the antenna as a transmission carrier. Thus, an RF circuit for supplying a transmission carrier to the modulator circuit is not required in the wireless communication RF circuit. As a result, the circuit is further simplified and miniaturized.

Alternatively the modulator circuit may be a binary phase shift keying (BPSK) modulator circuit.

An amplitude-adjusting resistor for adjusting the amplitude of a wave modulated by the modulator circuit is preferably connected in parallel with at least one of the SPST switching circuit and the modulator circuit. Accordingly, fluctuations in the amplitude of a wave modulated by the modulator circuit are greatly reduced by the amplitude-adjusting resistor.

The modulator circuit preferably includes a phase adjuster. Accordingly, the phase of a wave modulated by the modulator circuit is controlled. Outstanding BPSK modulation is thus performed.

The antenna is preferably a microstrip patch antenna. The microstrip patch antenna, the modulator circuit, the SPST switching circuit, and the demodulator circuit are preferably arranged on a common dielectric board. The dielectric board preferably has a relative dielectric constant of at least about 10. Accordingly, the wavelength shortening effect of the dielectric board is greatly improved, which enables miniaturization of the antenna.

According to another preferred embodiment of the present invention, a communication apparatus is provided which includes the above-described wireless communication RF circuit.

The communication apparatus may be a transponder that receives a radio wave emitted from an interrogator, mixes a signal wave with the received radio wave, and reflectively transmits the resulting radio wave to the interrogator.

According to preferred embodiments of the present invention, the modulator circuit, the SPST switching circuit, and the demodulator circuit are preferably defined by semiconductor devices such as FETs and diodes. When the circuit is defined by semiconductor devices, the circuit configuration is simplified, which enables further miniaturization of the circuit. In particular, when the modulator circuit and the demodulator circuit defined by similar FETs, the modulator circuit and the demodulator circuit can be integrated into an integrated circuit (IC). By integrating the modulator circuit and the demodulator circuit into an IC, a wireless communication RF circuit and a communication apparatus including the same are further miniaturized, and the circuit thereof is further simplified.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Preferred embodiments of the present invention will now be described with reference to the drawings.

Figure 1:
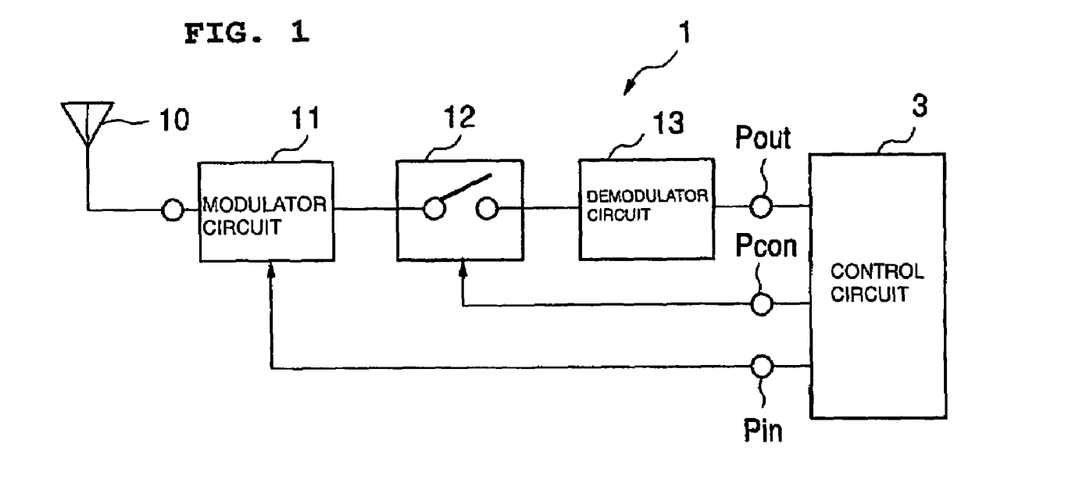
FIG. 1 is a block diagram showing the circuit configuration of a preferred embodiment of a wireless communication RF circuit according to the present invention.
Figure 2:
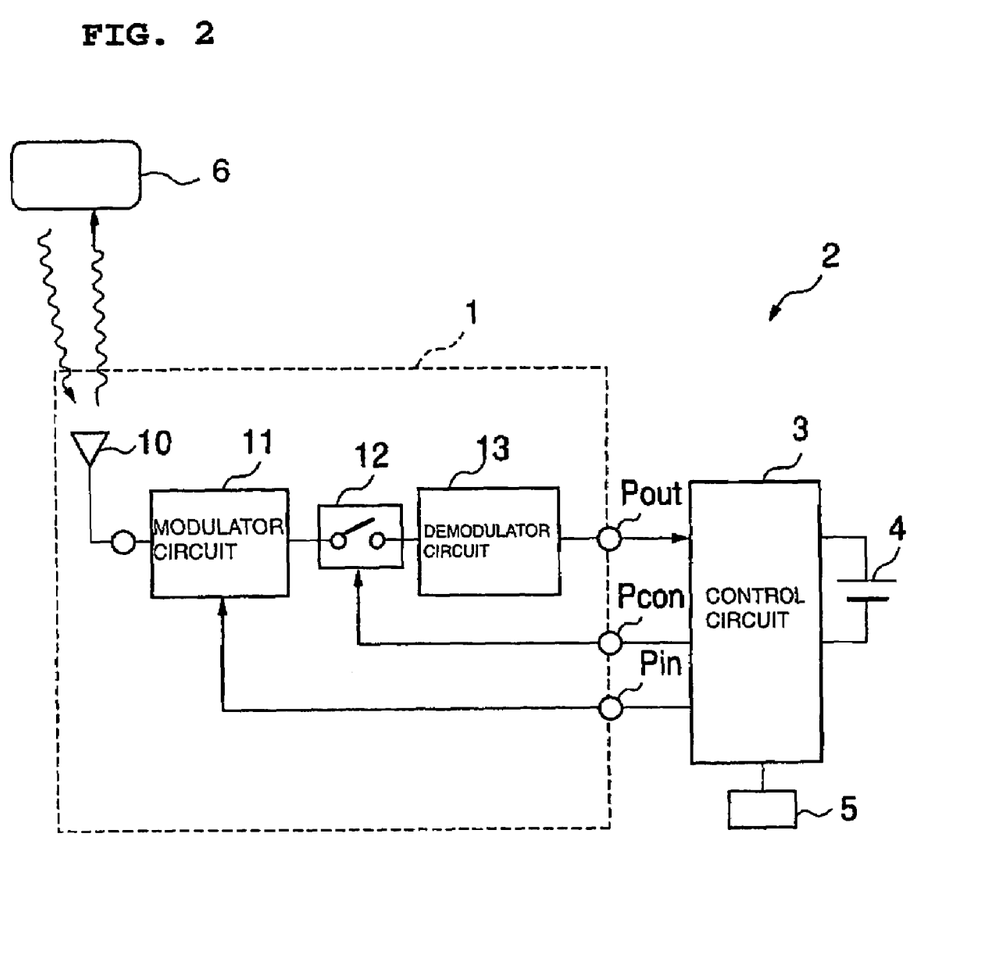
FIG. 2 is a block diagram of an example of the main configuration of a communication apparatus including the wireless communication RF circuit shown in FIG. 1.

FIG. 1 is a block diagram showing a preferred embodiment of a wireless communication RF circuit according to the present invention, along with a control circuit. FIG. 2 is a block diagram showing an example of the main circuit configuration of a communication apparatus including the wireless communication RF circuit of this preferred embodiment.

A communication apparatus 2 including a wireless communication RF circuit 1 according to this preferred embodiment includes, in addition to the wireless communication RF circuit 1, a control circuit (baseband IC) 3, a power supply circuit 4, and a clock circuit 5 that supplies a clock signal to the control circuit 3. The communication apparatus 2 is, for example, a transponder used with an interrogator 6, which is a mobile unit. The communication apparatus 2 receives a radio wave emitted from the interrogator 6, mixes a signal wave with the received radio wave, and reflectively transmits the radio wave towards the interrogator 6.

The wireless communication RF circuit 1 of this preferred embodiment includes an antenna 10, a modulator circuit 11, an SPST switching circuit 12, and a demodulator circuit 13.

The antenna 10 is a transmitting-and-receiving antenna for transmitting and receiving radio waves. The modulator circuit 11 includes a circuit configuration for modulating the phase of a radio wave received by the antenna 10 in accordance with a signal wave (transmission data) supplied from the control circuit 3 which functions as a signal feeder via a transmission data input port Pin and reflectively transmitting the radio wave.

The demodulator circuit 13 detects the radio wave received by the antenna 10, extracts a signal wave, and outputs the signal wave via a signal output port Pout to the control circuit 3. The demodulator circuit 13 includes a circuit configuration in accordance with a modulation system of the received radio wave. For example, the demodulator circuit 13 performs AM or ASK (amplitude shift keying) detection by a simple configuration using a diode, a capacitor, a coil, or other suitable components.

The SPST switching circuit 12 controls the turning ON and OFF of the signal continuity between the modulator circuit 11 and the demodulator circuit 13 on the basis of a control signal supplied from the control circuit 3 via a switching control signal input port Pcon. In this preferred embodiment, the SPST switching circuit 12 includes an FET, and the switching operation thereof is controlled such that the SPST switching circuit 12 is switched ON upon signal reception and switched OFF upon signal transmission. With the switching operation of the SPST switching circuit 12, a signal received by the antenna 10 is supplied to the demodulator circuit 13 upon signal reception. Upon signal transmission, the demodulator circuit 13 is separated from the modulator circuit 11 to prevent the demodulator circuit 13 from having an adverse effect on the modulator circuit 11 upon transmission.

Figure 3:
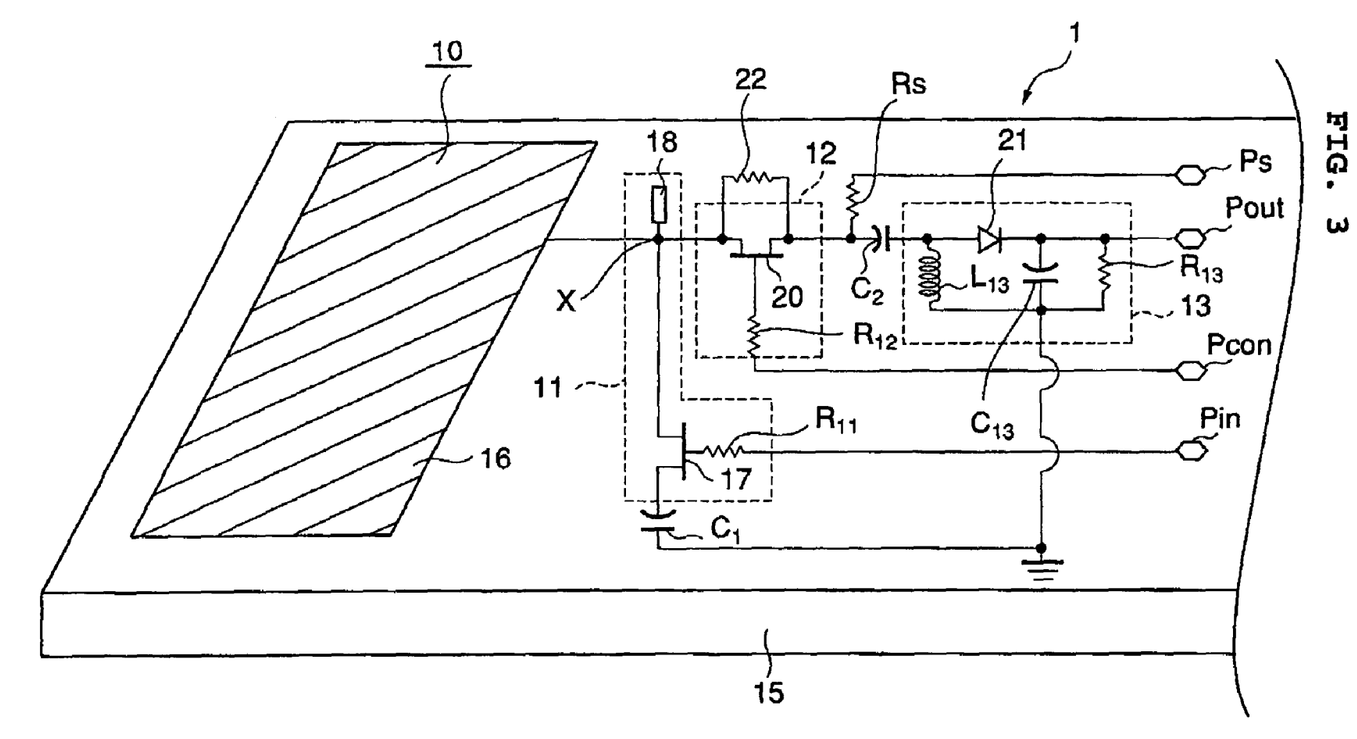
FIG. 3 is a circuit diagram showing a specific example of a wireless communication RF circuit according to a preferred embodiment of the present invention.

FIG. 3 shows a specific example of the configuration of the wireless communication RF circuit 1. Referring to FIG. 3, the antenna 10 is preferably a microstrip patch antenna. A radiating electrode 16 defining the microstrip patch antenna is directly disposed on a circuit board 15, which is a dielectric board on which the modulator circuit 11 and the demodulator circuit 13 are arranged. In other words, in this preferred embodiment, the antenna 10, the modulator circuit 11, the SPST switching circuit 12, and the demodulator circuit 13 are arranged on the common circuit board 15. In this preferred embodiment, the circuit board 15 is preferably made of a dielectric material having a relative dielectric constant of at least about 10. Making the circuit board 15 of such a dielectric material having a high relative dielectric constant increases the wavelength shortening effect of the circuit board 15. Miniaturization of the radiating electrode 16 (antenna 10) is thus facilitated.

In order to achieve further miniaturization of the antenna 10, for example, the circuit board 15 is preferably made of a dielectric material having a relative dielectric constant of 20 or greater. For example, when the relative dielectric constant of the circuit board 15 is approximately 20, the radiating electrode 16 of the microstrip patch antenna for transmitting and receiving radio waves in the 5 GHz band is miniaturized to approximately 5 mm by 5 mm.

The modulator circuit 11 includes an FET 17, a stub electrode 18, and a bias resistor $R_{11}$.

The FET 17 is, for example, an MES field effect transistor. In the example shown in the drawing, the source (S) is connected to the radiating electrode 16, and the drain (D) is RF-grounded through a DC preventing capacitor $C_1$. The gate (G) is connected to the transmission data input port Pin through the bias resistor $R_{11}$. Transmission data is supplied from the control circuit 3 through the transmission data input port Pin to the gate of the FET 17.

Figure 4A:
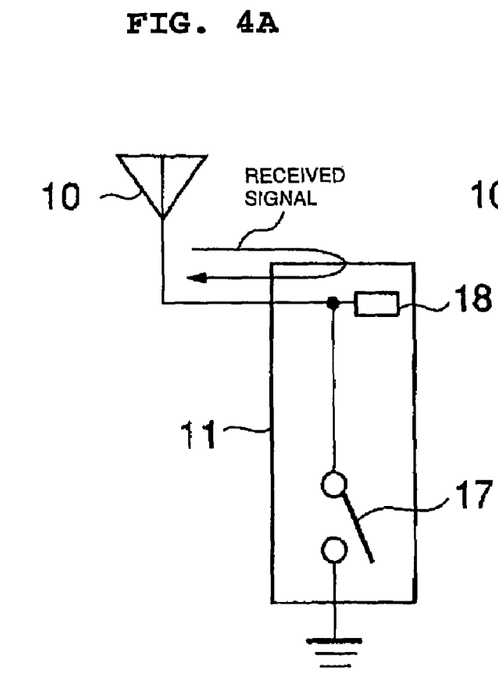
FIGS. 4(a) and 4(b) are illustrations describing examples of operation of a modulator circuit shown in FIG. 3.
Figure 4B:
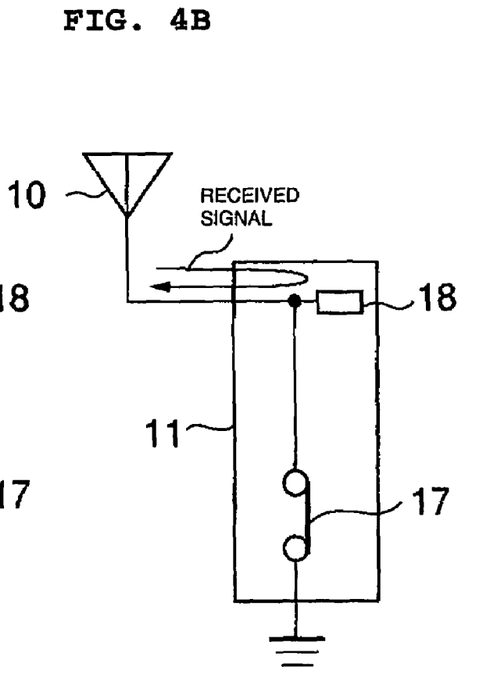

The FET 17 is switched ON and OFF in accordance with transmission data supplied to the gate thereof. The modulator circuit 11 reflects the entire signal received by the antenna 10 when, as shown in FIG. 4(a), the FET 17 is switched OFF and when, as shown in FIG. 4(b), the FET 17 is switched ON. Also, the phase of a signal reflected when the FET 17 is switched ON differs by 180 degrees from the phase of a signal reflected when the FET 17 is switched OFF. In other words, the modulator circuit 11 is a binary phase shift keying (BPSK) reflective modulator circuit.

Ideally, the phase of the reflected signal is inverted by 180 degrees by switching ON and OFF the FET 17. Actually, however, the phase of the reflected signal is not inverted by exactly 180 degrees due to the impedance of the FET 17. In consideration of this drawback, the stub electrode 18 defining a phase adjuster is connected on a signal path between the antenna 10 and the FET 17. The stub electrode 18 is a distributed-constant line and adjusts the phase difference between the signal reflected when the FET 17 is switched ON and the signal reflected when the FET 17 is switched OFF. In this preferred embodiment, with the stub electrode 18, the phase of the reflected signal is adjusted to be inverted by 180 degrees by switching ON and OFF the FET 17.

The SPST switching circuit 12 includes an FET 20 and a bias resistor $R_{12}$. The FET 20 is defined by an N-channel MES field effect transistor which has excellent RF characteristics. The drain (D) of the FET 20 is connected to the modulator circuit 11. The source (S) is connected to the demodulator circuit 13 via a DC preventing capacitor $C_2$. The gate (G) is connected via the bias resistor $R_{12}$ to the switching control signal input port Pcon. A control signal for controlling the switching operation is supplied from the control circuit 3 through the switching control signal input port Pcon to the gate of the FET 20. The FET 20 is switched ON and OFF in accordance with the control signal.

In the example shown in FIG. 3, an FET reference potential determining signal input port Ps is connected via a bias resistor Rs between the SPST switching circuit 12 and the demodulator circuit 13. A signal for determining a DC potential of a channel between source and drain of each of the FET 17 of the modulator circuit 11 and the FET 20 of the SPST switching circuit 12 is input from the control circuit 3 through the FET reference potential determining signal input port Ps.

The FETs 17 and 20 are configured such that the channel between the source and the drain is turned ON and OFF by the relative relationship between the DC potential of the channel between the source and the drain, and the DC potential of the gate. In this preferred embodiment, a direct current applied from the FET reference potential determining signal input port Ps, and a switching-ON voltage and a switching-OFF voltage applied from the switching control signal input port Pcon are set to appropriate values that enable the switching operation of the FETs 17 and 20.

A resistor 22 is connected in parallel with the SPST switching circuit 12. The resistor 22 is provided to prevent and minimize fluctuations in the amplitude of a reflected signal (modulated wave) by the modulator circuit 11. In other words, a reflection coefficient of the signal from the modulator circuit 11 may change in accordance with the switching ON and OFF of the FET 17. The change in the reflection coefficient may produce fluctuations in the amplitude of the reflected signal. The resistor 22 is provided to suppress such fluctuations in the amplitude of the reflected signal.

In this example, the resistor 22 is arranged in parallel with the SPST switching circuit 12. Upon reception, the switching ON operation of the SPST switching circuit 12 causes a major portion the received signal to pass through the SPST switching circuit 12 while almost no signal passes through the resistor 22. Loss of the received signal due to the resistor 22 is thus reduced to a very small amount.

The amplitude-adjusting resistor 22 may also be arranged in parallel with the modulator circuit 11. In this case, as in the above-described case, fluctuations in the amplitude of the reflected signal by the modulator circuit 11 are effectively prevented.

The demodulator circuit 13 includes a diode 21, a demodulation output ground inductor $L_{13}$, a reception RF input ground capacitor $C_{13}$, and a load resistor $R_{13}$.

The diode 21 is a detector diode for extracting a signal wave from a signal received by the antenna 10 using non-linearity. In this case, the diode 21 is defined by a zero-bias detector Schottky barrier diode capable of performing efficient detection without applying of bias.

Figure 5A:
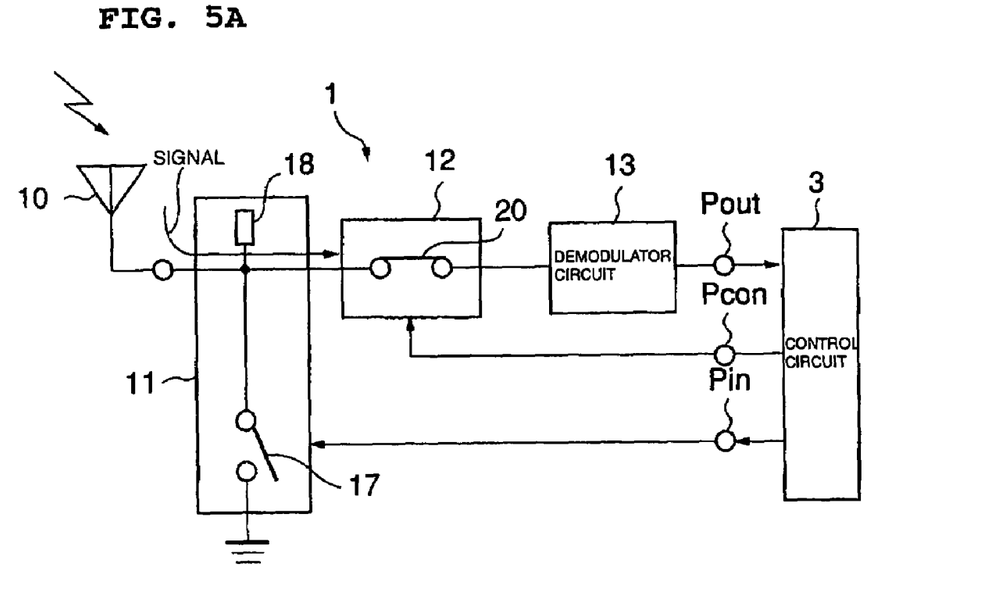
FIGS. 5(a) and 5(b) are illustrations describing examples of operation of the wireless communication RF circuit shown in FIG. 3.

An example of the circuit operation of the wireless communication RF circuit 1 shown in FIG. 3 will now be described schematically. For example, when the communication apparatus 2 is not transmitting/receiving a radio wave to/from the interrogator 6 (standby period), as shown in FIG. 5(*a*), the FET 17 is in the switched OFF state in response to a switching OFF signal supplied from the control circuit 3 via the transmission data input port Pin to the gate of the FET 17 of the modulator circuit 11. Accordingly, when the modulator circuit 11 is observed from the antenna 10, the modulator circuit 11 is opened. The influence of the modulator circuit 11 thus is negligible.

In the standby period, the FET 20 is switched ON in response to a switching ON control signal supplied from the control circuit 3 via the switching control signal input port Pcon to the gate of the FET 20 of the SPST switching circuit 12. The FET 20 is thus on standby for reception of a signal from the interrogator 6.

In such a standby mode, when the antenna 10 receives a radio wave from the interrogator 6, the received signal is supplied from the antenna 10 via the SPST switching circuit 12 to the demodulator circuit 13. The demodulator circuit 13 performs detection to extract a signal wave from the received signal, and the signal wave is output to the control circuit 3.

Figure 5B:
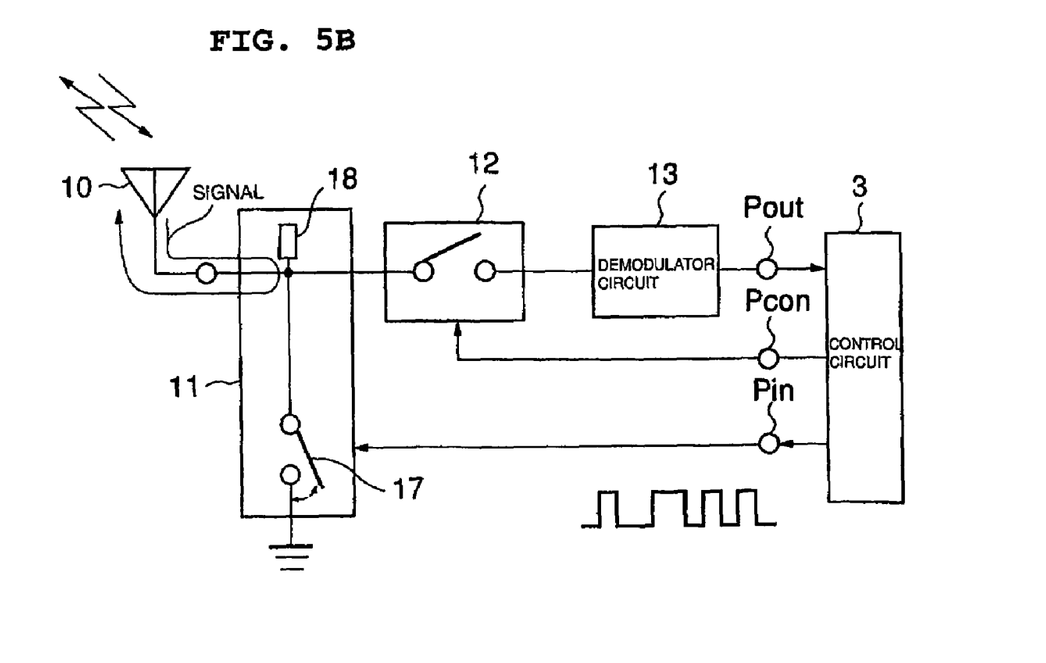

When the control circuit 3 receives the signal wave from the demodulator circuit 13, the control circuit 3 outputs a switching OFF control signal via the switching control signal input port Pcon to the FET 20 of the SPST switching circuit 12. Accordingly, as shown in FIG. 5(*b*), the SPST switching circuit 12 is switched OFF.

The control circuit 3 supplies transmission data (for example, a digital signal for transmitting data such as personal identification information) via the transmission data input port Pin to the gate of the FET 17 of the modulator circuit 11. In accordance with the transmission data, the FET 17 of the modulator circuit 11 is switched ON and OFF. The modulator circuit 11 performs BPSK modulation of a signal received by the antenna 10 and reflectively transmits the signal to the interrogator 6.

Upon signal transmission, if the SPST switching circuit 12 is switched ON, part of a signal received by the antenna 10 leaks into the demodulator circuit 13, which substantially increases loss. In contrast, in this example, upon transmission, the SPST switching circuit 12 is switched OFF, and the demodulator circuit 13 is separated from the modulator circuit 11. This prevents increased loss to leakage of the signal received by the antenna 10 into the demodulator circuit 13.

In the circuit configuration shown in FIG. 3, upon signal reception, the switching OFF of the FET 17 makes the influence of the modulator circuit 11 negligible with respect to the signal received by the antenna 10. The modulator circuit 11 does not adversely effect the circuit operation of the demodulator circuit 13 upon signal reception. Upon signal transmission, the switching OFF of the SPST switching circuit 12 separates the demodulator circuit 13 from the modulator circuit 11. The demodulator circuit 13 does not adversely effect the circuit operation of the modulator circuit 11 upon signal transmission. Accordingly, a signal branching device, such as a circulator, a diplexer, or an SPDT switching circuit, which is generally used as a transmission/reception switching portion, is unnecessary in the present invention. The circuit configuration is thus greatly simplified.

Figure 6:
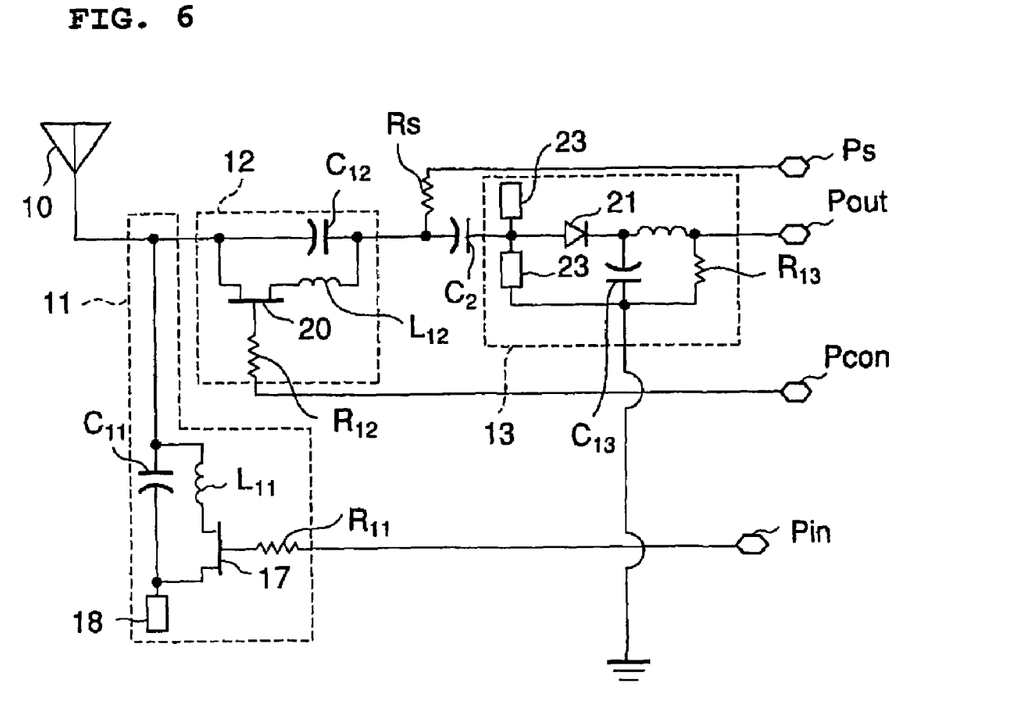
FIG. 6 is a circuit diagram for describing another preferred embodiment of the wireless communication RF circuit.

The present invention is not limited to this preferred embodiment and may include various modifications. For example, in the example of the circuit shown in FIG. 3, the SPST switching circuit 12 controls the turning ON and OFF of the signal continuity between the modulator circuit 11 and the demodulator circuit 13 on the basis of the turning ON and OFF of the channel between source and drain of the FET 20. However, the configuration of the SPST switching circuit 12 is not limited to this circuit configuration. Alternatively, for example, a configuration such as that shown in FIG. 6 may be provided. In the case of FIG. 6, the SPST switching circuit 12 includes the FET 20, the bias resistor $R_{12}$, a capacitor $C_{12}$, and an inductor $L_{12}$. The capacitor $C_{12}$ is arranged on a signal path connecting between the modulator circuit 11 and the demodulator circuit 13. The drain of the FET 20 is connected to one end of the capacitor $C_{12}$, and one end of the inductor $L_{12}$ is connected to the other end of the capacitor $C_{12}$. The other end of the inductor $L_{12}$ is connected to the source of the FET 20. The gate of the FET 20 is connected via the bias resistor $R_{12}$ to the switching control signal input port Pcon.

In the SPST switching circuit 12 shown in FIG. 6, when the channel between the source and the drain of the FET 20 is turned ON on the basis of a control signal supplied from the control circuit 3 via the switching control signal input port Pcon to the gate of the FET 20, parallel resonance between the capacitor $C_{12}$ and the inductor $L_{12}$ occurs, and the overall SPST switching circuit 12 is in the switched OFF state.

In contrast, when the channel between the source and the drain of the FET 20 is turned OFF, the modulator circuit 11 and the demodulator circuit 13 are electrically connected via the capacitor $C_{12}$, and the overall SPST switching circuit 12 is in the switched ON state.

The SPST switching circuit 12 may include a circuit configuration such as that shown in FIG. 6. Alternatively, the SPST switching circuit 12 may include two or more FETs. Alternatively, the SPST switching circuit 12 may include, in place of the FET, another device which is capable of being switched ON and OFF, such as a dipolar or bipolar transistor, a PIN diode, or a varactor.

The same applies to the modulator circuit 11. The modulator circuit 11 may include a configuration other than the circuit configuration shown in FIG. 3. For example, the modulator circuit 11 may include a configuration such as that shown in FIG. 6. In this case, as in the above-described SPST switching circuit 12 of FIG. 6, the switching operation for modulation is performed by the FET 17, a capacitor $C_{11}$, and an inductor $L_{11}$. As in the above-described SPST switching circuit 12, a circuit section that includes two or more FETs may be provided as a circuit section for switching ON and OFF the modulator circuit 11. In place of the FET 17, another device capable of being switched ON and OFF (such as a bipolar or dipolar transistor, a PIN diode, or a varactor) may be provided.

In the example shown in FIG. 3, the drain of the FET 17 is RF (high-frequency)-grounded. However, the drain may be connected to an open-ended line. In this case, for example, as shown in FIG. 6, the phase-adjusting stub electrode 18 is provided as the open-ended line. In this case, in order for the modulator circuit 11 to perform BPSK modulation, preferably the sum of the line length of the stub electrode 18 functioning as the open-ended line and the amount of the phase of the modulator circuit 11 that is in the switched ON state is about λ/4 wavelength of the received radio wave.

In FIG. 3, the stub electrode 18 is provided as the phase adjuster. Alternatively, for example, in place of the stub electrode 18, a lumped-constant device, such as a capacitor, may be provided as the phase adjuster.

In FIG. 3, the lumped-constant inductor $L_{13}$ is arranged to define the input port of the demodulator circuit 13. Alternatively, for example, as shown in FIG. 6, in place of the inductor $L_{13}$, a circuit section for matching the input impedance with the low-frequency ground using a line 23 is provided. The configuration of the demodulator circuit 13 is not limited to that shown in FIG. 3. The demodulator circuit 13 may have another circuit configuration.

In this preferred embodiment, the radiating electrode 16 of the antenna 10 is square. However, the shape of the radiating electrode 16 is not particularly limited, and the radiating electrode 16 can have various shapes.

In this preferred embodiment, the antenna 10 preferably includes the radiating electrode 16 that is arranged directly on the dielectric board on which the modulator circuit 11 and the demodulator circuit 13 are arranged. Alternatively, for example, the antenna 10 may be manufactured by arranging a radiating electrode on a dielectric board (base member) with a relative dielectric constant of at least about 10, which is separate from the circuit board, and the antenna 10 may be mounted on the circuit board.

In this preferred embodiment, circuits including the modulator circuit 11 and the demodulator circuit 13 are preferably arranged on the same side of the board as the side on which the radiating electrode 16 of the antenna 10 is arranged. Alternatively, for example, the radiating electrode 16 may be arranged on the front side of the board, and circuits including the modulator circuit 11 and the demodulator circuit 13 may be arranged on the rear side of the board.

According to a wireless communication radio frequency circuit and a communication apparatus including the same, the wireless communication radio frequency circuit includes an antenna that transmits and receives radio waves, a demodulator circuit that detects a received radio wave received by the antenna and extracts a signal wave, and a modulator circuit that mixes a signal wave supplied from a signal feeder with a carrier. The antenna, the modulator circuit, and the demodulator circuit are serially connected to one another in a sequence. An SPST (Single Pole Single Throw) switching circuit is serially provided between the modulator circuit and the demodulator circuit. The SPST switching circuit is switched ON upon reception to electrically connect a signal received by the antenna to the demodulator circuit and switched OFF upon transmission to separate the demodulator circuit from the modulator circuit. The SPST switching circuit includes an FET. Accordingly, the wireless communication radio frequency circuit and the communication apparatus including the same are greatly miniaturized, and the circuit configuration thereof is greatly simplified.

While preferred embodiments of the invention have been described above, it is to be understood that variations and modifications will be apparent to those skilled in the art without departing the scope and spirit of the invention. The scope of the invention, therefore, is to be determined solely by the following claims.

The invention claimed is:

1. A wireless communication radio frequency circuit comprising:
   an antenna that transmits and receives radio waves;
   a demodulator circuit that detects a received radio wave received by the antenna and extracts a signal wave; and
   a modulator circuit that mixes a signal wave supplied from a signal feeder with a carrier; wherein
   the antenna, the modulator circuit, and the demodulator circuit are serially connected to one another in a sequence;
   a Single Pole Single Throw switching circuit is serially connected directly between the modulator circuit and the demodulator circuit;
   the Single Pole Single Throw switching circuit is switched ON upon reception to transmit a signal received by the antenna to the demodulator circuit and is switched OFF upon transmission to separate the demodulator circuit from the modulator circuit; and
   the Single Pole Single Throw switching circuit includes an FET.

2. A wireless communication radio frequency circuit according to claim 1, wherein the demodulator circuit is one of an AM detector circuit that demodulates a received radio wave having an amplitude that has been modulated and an Amplitude Shift Keying detector circuit that demodulates a received radio wave that has been Amplitude shift Keying-modulated.

3. A wireless communication radio frequency circuit according to claim 1, wherein the demodulator circuit includes a zero-bias detector Schottky barrier diode.

4. A wireless communication radio frequency circuit according to claim 1, wherein the modulator circuit includes an FET.

5. A wireless communication radio frequency circuit according to claim 1, wherein the modulator circuit is a binary phase shift keying modulator circuit.

6. A wireless communication radio frequency circuit according to claim 1, wherein an amplitude-adjusting resistor for adjusting the amplitude of a wave modulated by the modulator circuit is connected in parallel with at least one of the Single Pole Single Throw switching circuit and the modulator circuit.

7. A wireless communication radio frequency circuit according to claim 1, wherein the modulator circuit includes a phase adjuster.

8. A wireless communication radio frequency circuit according to claim 1, wherein the antenna is a microstrip patch antenna, and the microstrip patch antenna, the modulator circuit, the SPST switching circuit, and the demodulator circuit are arranged on a common dielectric board, the dielectric board having a relative dielectric constant of at least about 10.

9. A communication apparatus comprising a wireless communication radio frequency circuit according to claim 1.

10. A communication apparatus according to claim 9, wherein the communication apparatus is a transponder that receives a radio wave emitted from an interrogator, mixes a signal wave with the received radio wave, and reflectively transmits the resulting radio wave to the interrogator.

11. A wireless communication radio frequency circuit comprising:
    an antenna that transmits and receives radio waves;
    a demodulator circuit that detects a received radio wave received by the antenna and extracts a signal wave; and
    a modulator circuit that mixes a signal wave supplied from a signal feeder with a carrier; wherein the antenna, the modulator circuit, and the demodulator circuit are serially connected to one another in a sequence;

a Single Pole Single Throw switching circuit is serially connected between the modulator circuit and the demodulator circuit;

the Single Pole Single Throw switching circuit is switched ON upon reception to transmit a signal received by the antenna to the demodulator circuit and is switched OFF upon transmission to separate the demodulator circuit from the modulator circuit;

the Single Pole Single Throw switching circuit includes an FET; and the modulator circuit is a reflective modulator circuit that modulates the phase of the signal received by the antenna in accordance with the signal wave and reflectively transmits the modulated signal.

12. A wireless communication radio frequency circuit comprising:

an antenna that transmits and receives radio waves;

a demodulator circuit that detects a received radio wave received by the antenna and extracts a signal wave; and a modulator circuit that mixes a signal wave supplied from a signal feeder with a carrier; wherein the antenna, the modulator circuit, and the demodulator circuit are serially connected to one another in a sequence; and a Single Pole Single Throw switching circuit is serially connected directly between the modulator circuit and the demodulator circuit.

13. A wireless communication radio frequency circuit according to claim 12, wherein the Single Pole Single Throw switching circuit is switched ON upon reception to transmit a signal received by the antenna to the demodulator circuit and is switched OFF upon transmission to separate the demodulator circuit from the modulator circuit.

14. A wireless communication radio frequency circuit according to claim 12, wherein the Single Pole Single Throw switching circuit includes an FET.

15. A wireless communication radio frequency circuit according to claim 12, wherein the demodulator circuit is one of an AM detector circuit that demodulates a received radio wave having an amplitude that has been modulated and an Amplitude Shift Keying detector circuit that demodulates a received radio wave that has been Amplitude Shift Keying-modulated.

16. A wireless communication radio frequency circuit according to claim 12, wherein the demodulator circuit includes a zero-bias detector Schottky barrier diode.

17. A wireless communication radio frequency circuit according to claim 12, wherein the modulator circuit includes an FET.

18. A wireless communication radio frequency circuit according to claim 12, wherein the modulator circuit is a reflective modulator circuit that modulates the phase of the signal received by the antenna in accordance with the signal wave and reflectively transmits the modulated signal.

19. A wireless communication radio frequency circuit according to claim 12, wherein the modulator circuit is a binary phase shift keying modulator circuit.

20. A wireless communication radio frequency circuit according to claim 12, wherein an amplitude-adjusting resistor for adjusting the amplitude of a wave modulated by the modulator circuit is connected in parallel with at least one of the Single Pole Single Throw switching circuit and the modulator circuit.

21. A wireless communication radio frequency circuit according to claim 12, wherein the modulator circuit includes a phase adjuster.

22. A wireless communication radio frequency circuit according to claim 12, wherein the antenna is a microstrip patch antenna, and the microstrip patch antenna, the modulator circuit, the SPST switching circuit, and the demodulator circuit are arranged on a common dielectric board, the dielectric board having a relative dielectric constant of at least about 10.

23. A communication apparatus comprising a wireless communication radio frequency circuit according to claim 12.

24. A communication apparatus according to claim 23, wherein the communication apparatus is a transponder that receives a radio wave emitted from an interrogator, mixes a signal wave with the received radio wave, and reflectively transmits the resulting radio wave to the interrogator.

* * * * *